United States Patent [19]
Altschul et al.

[11] Patent Number: 6,061,580
[45] Date of Patent: *May 9, 2000

[54] DISPOSABLE WIRELESS TELEPHONE AND METHOD FOR CALL-OUT ONLY

[75] Inventors: Randice-Lisa Altschul, Cliffside Park; Lee S. Volpe, Collingswood, both of N.J.

[73] Assignee: Randice-Lisa Altschul, Cliffside Park, N.J.

[ * ] Notice: This patent is subject to a terminal disclaimer.

[21] Appl. No.: 08/958,119

[22] Filed: Oct. 27, 1997

Related U.S. Application Data

[63] Continuation-in-part of application No. 08/844,149, Apr. 18, 1997, which is a continuation-in-part of application No. 08/808,339, Feb. 28, 1997.

[51] Int. Cl.[7] .................................................... H04B 1/06
[52] U.S. Cl. ............................................. 455/575; 455/418
[58] Field of Search ............................. 455/575, 90, 418, 455/230, 231

[56] References Cited

U.S. PATENT DOCUMENTS

| | | |
|---|---|---|
| D. 340,714 | 10/1993 | Hoffman . |
| D. 369,167 | 4/1996 | Hanson et al. . |
| 3,052,823 | 9/1962 | Anderson et al. . |
| 4,210,870 | 7/1980 | Kallio-Könnö . |
| 4,755,911 | 7/1988 | Suzuki . |
| 4,776,000 | 10/1988 | Parienti . |
| 4,783,799 | 11/1988 | Maass . |
| 4,831,647 | 5/1989 | D'Avello et al. . |
| 4,856,046 | 8/1989 | Streck et al. . |
| 4,881,254 | 11/1989 | Hollewed et al. . |
| 4,916,441 | 4/1990 | Gombrich . |
| 4,951,308 | 8/1990 | Bishop et al. . |
| 5,138,650 | 8/1992 | Stahl et al. . |
| 5,161,250 | 11/1992 | Ianna et al. . |
| 5,220,593 | 6/1993 | Zicker et al. . |
| 5,225,969 | 7/1993 | Takaya et al. . |
| 5,233,642 | 8/1993 | Renton . |
| 5,301,223 | 4/1994 | Amadon et al. . |
| 5,307,508 | 4/1994 | Rollins et al. . |
| 5,327,382 | 7/1994 | Yamamoto . |
| 5,327,482 | 7/1994 | Yamamoto . |
| 5,359,182 | 10/1994 | Schilling . |
| 5,365,570 | 11/1994 | Boubelik . |
| 5,376,931 | 12/1994 | Marrs . |
| 5,379,193 | 1/1995 | Gall et al. . |
| 5,388,148 | 2/1995 | Seiderman . |
| 5,423,080 | 6/1995 | Perret et al. . |
| 5,438,612 | 8/1995 | Norimatsu . |
| 5,461,664 | 10/1995 | Cappadona . |
| 5,504,808 | 4/1996 | Hamrick, Jr. . |
| 5,509,196 | 4/1996 | Davis et al. . |
| 5,511,114 | 4/1996 | Stimson et al. . |
| 5,517,555 | 5/1996 | Amadon et al. . |

(List continued on next page.)

FOREIGN PATENT DOCUMENTS

| | | |
|---|---|---|
| 2262685 | 6/1993 | United Kingdom . |
| 2262685A | 6/1993 | United Kingdom . |
| 9216078 | 9/1992 | WIPO . |
| WO 92/16078 | 9/1992 | WIPO . |
| 9603001 | 2/1996 | WIPO . |
| WO 96/03001 | 2/1996 | WIPO . |

*Primary Examiner*—Nguyen Vo
*Assistant Examiner*—N. Mehrpour
*Attorney, Agent, or Firm*—Arthur Jacob

[57] ABSTRACT

A disposable wireless telephone and a method of using a disposable wireless telephone capable of use for telephonic communications only for a limited period, and only for telephonic communications initiated at the disposable wireless telephone, within which limited period the sum of the durations of the telephonic communications reach the duration of the limited period, after which limited period the telephone is rendered inoperative and is discarded.

12 Claims, 9 Drawing Sheets

U.S. PATENT DOCUMENTS

| | | |
|---|---|---|
| 5,541,985 | 7/1996 | Ishii et al. . |
| 5,550,897 | 8/1996 | Seiderman . |
| 5,558,928 | 9/1996 | DiStefano et al. . |
| 5,563,934 | 10/1996 | Eda . |
| 5,577,100 | 11/1996 | McGregor et al. . |
| 5,577,109 | 11/1996 | Stimson et al. . |
| 5,579,379 | 11/1996 | D'Amico et al. . |
| 5,583,918 | 12/1996 | Nakagawa . |
| 5,592,537 | 1/1997 | Moen . |
| 5,608,778 | 3/1997 | Partridge, III . |
| 5,615,087 | 3/1997 | Wieloch . |
| 5,615,260 | 3/1997 | Kurgan . |
| 5,621,787 | 4/1997 | McKoy et al. . |
| 5,625,669 | 4/1997 | McGregor et al. . |
| 5,627,886 | 5/1997 | Bowman . |
| 5,629,977 | 5/1997 | Fonseca . |
| 5,631,947 | 5/1997 | Wittstein et al. . |
| 5,673,306 | 9/1997 | Amadon et al. . |
| 5,673,309 | 9/1997 | Woynoski et al. . |
| 5,675,636 | 10/1997 | Gray . |
| 5,677,945 | 10/1997 | Mullins et al. . |
| 5,684,861 | 11/1997 | Lewis et al. . |
| 5,815,807 | 9/1998 | Osmani et al. ............ 455/410 |
| 5,845,218 | 12/1998 | Altschul ............ 455/565 |
| 5,875,393 | 2/1999 | Altschul et al. ............ 455/407 |

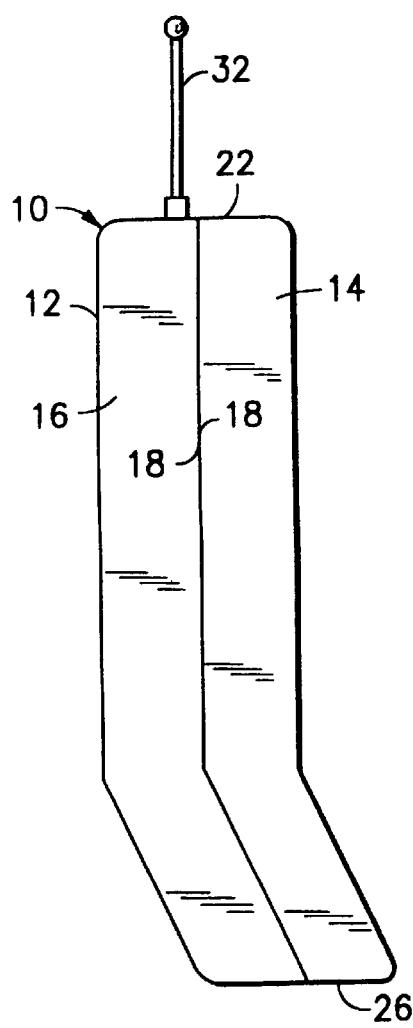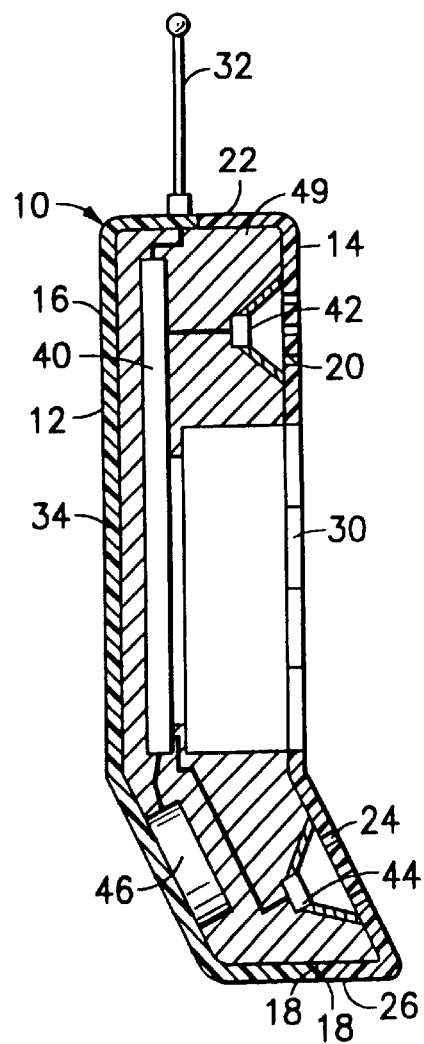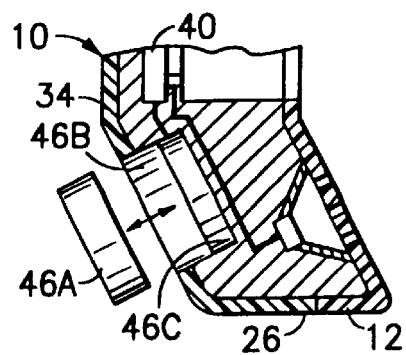

DISPOSABLE WIRELESS TELEPHONE AND METHOD FOR CALL-OUT ONLY

This is a continuation-in-part of application Ser. No. 08/844,149, filed Apr. 18, 1997, which, in turn, is a continuation-in-part of application Ser. No. 08/808,339, filed Feb. 28, 1997.

The present invention relates generally to telephonic communications and pertains, more specifically, to a disposable wireless telephone and method for facilitating the use of wireless telephones.

The increasing popularity of wireless telephones, prompted by the widespread availability of cellular wireless telephone services, has led to a demand for more convenience and greater availability in wireless telephones and more economical wireless telephone use. The present invention places wireless telephone services within the easy reach of a greater population, thereby facilitating telephonic communication among increased numbers of people, in business and commercial fields as well as in domestic and personal uses.

Thus, the present invention provides a disposable wireless telephone and method for facilitating the use of wireless telephones. As such, the present invention attains several objects and advantages, some of which may be summarized as follows: Simplifies and renders more economical the use of wireless telephone services; renders wireless telephone services available to a larger audience at lowered cost; facilitates the distribution and use of wireless telephones; reduces the expense of wireless telephones and wireless telephone services; promotes the use of wireless telephones and wireless telephone services by those who otherwise would not invest in a wireless telephone and expend funds for wireless telephone services; makes available prepaid wireless telephone services at relatively low cost and greater convenience; facilitates the availability of wireless telephones and wireless telephone services for emergency uses; provides added convenience in obtaining as well as using wireless telephones and wireless telephone services.

The above object and advantages, as well as further objects and advantages, are attained by the present invention which may be described briefly as a disposable wireless telephone capable of use for telephonic communication only during a limited period, after which period the telephone is rendered inoperative for telephonic communication and is discarded, the telephone comprising: telephonic means for transmitting and receiving telephonic communications; enabling/disabling means for enabling the telephonic means for telephonic communications during the limited period and disabling the telephonic means for telephonic communications upon expiration of the limited period, whereby the telephone is rendered inoperative beyond the limited period and is capable of being discarded; and selective operating means for operating the telephonic means for telephonic communications of selected durations, the enabling/disabling means being responsive to the selective operating means such that telephonic communication is disabled for telephonic communications when the sum of the selected durations reaches the limited period; the telephonic means comprising telephonic circuitry enabling the transmitting and receiving of telephonic communication only for telephonic communications initiated at the disposable wireless telephone.

In addition, the present invention includes a method of using a disposable wireless telephone for telephonic communications during only the duration of a limited period, after which period the telephone is rendered inoperative and is discarded, the telephone including telephonic means for transmitting and receiving telephonic communications, the method comprising: enabling the telephonic means for telephonic communications during the duration of the limited period, and only for telephonic communications initiated at the disposable wireless telephone; operating the telephonic means for telephonic communications of selected durations; disabling telephonic communication through the telephonic means upon the sum of the selected durations reaching the duration of the limited period, whereby the telephone is rendered inoperative beyond the limited period and is capable of being discarded.

More specifically, the present invention concerns a disposable wireless telephone capable of use for telephonic communication only during a limited period, after which period the telephone is rendered inoperative for telephonic communication and is discarded, the telephone comprising: telephonic means for transmitting and receiving telephonic communications, the telephonic means including a call destination selector for selecting the destination of a telephonic communication, the destination being selected from different rate destinations; enabling/disabling means for enabling the telephonic means for telephonic communications during the limited period and disabling the telephonic means for telephonic communications upon expiration of the limited period, whereby the telephone is rendered inoperative beyond the limited period and is capable of being discarded; selective operating means for operating the telephonic means for telephonic communications of selected durations, the enabling/disabling means being responsive to the selective operating means such that telephonic communication is disabled for telephonic communications when the sum of the selected durations reaches the limited period; the enabling/disabling means including setting means for determining a maximum duration of the limited period, and disabling means for rendering the telephonic means inoperative in response to the sum of the selected durations reaching the duration of the limited period; the setting means including rate code means responsive to the call destination selector for operating the setting means at a rate determined by the selected destination of the telephonic communication to vary the duration of the limited period, up to the maximum duration, in accordance with the selected destination of the telephonic communication so as to enable telephonic communications to different rate destinations during the duration of the limited period; the telephonic means comprising telephonic circuitry enabling the transmitting and receiving of telephonic communication only for telephonic communications initiated at the disposable wireless telephone.

The invention will be understood more fully, while still further objects and advantages will become apparent, in the following detailed description of preferred embodiments of the invention illustrated in the accompanying drawing, in which:

FIG. 3 is a side elevational view of the disposable wireless telephone;

FIG. 4 is a cross-sectional view taken along line 4—4 of FIG. 2;

FIG. 5 is a fragment of a cross-sectional view similar to FIG. 4, but showing an alternate arrangement;

Figure 1:
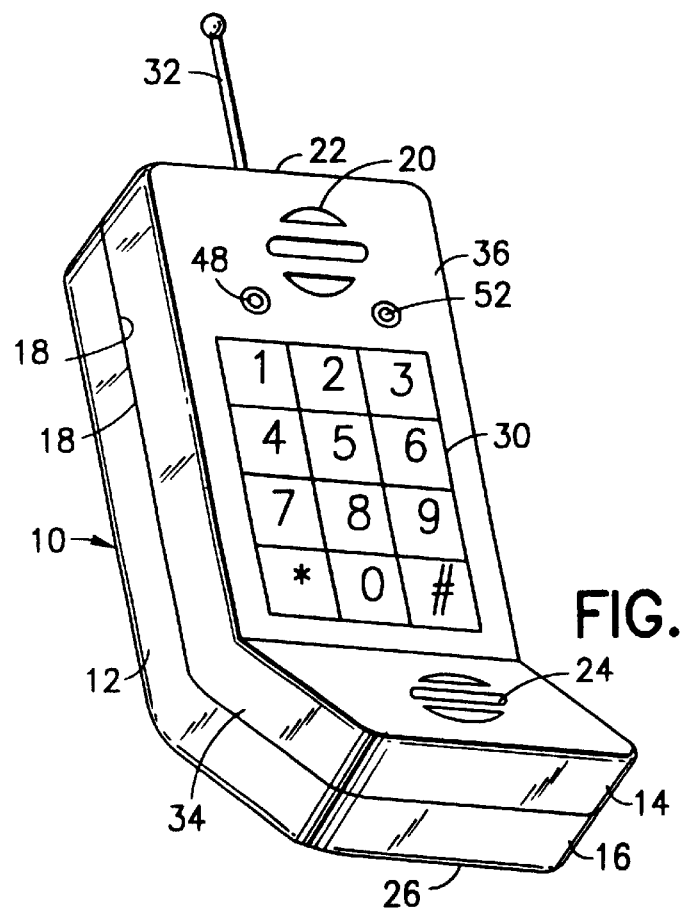
FIG. 1 is pictorial perspective view of a disposable wireless telephone constructed in accordance with one aspect of the present invention.
Figure 2:
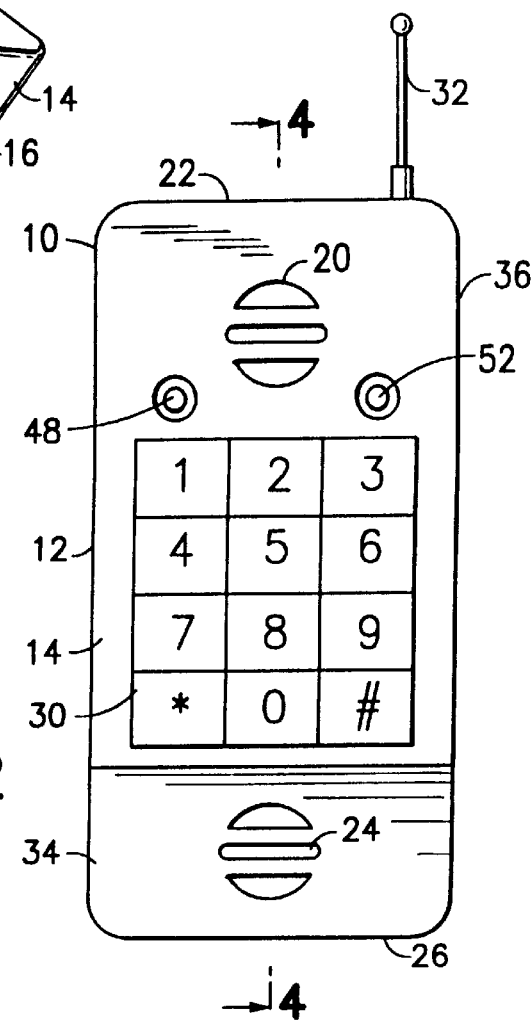
FIG. 2 is a front elevational view of the disposable wireless telephone.

Referring now to the drawing, and especially to FIGS. 1 through 3 thereof, a disposable wireless telephone is illustrated generally at 10 and is seen to include a case 12 having a front case member 14 and a rear case member 16, joined together along abutting edges 18. An earphone grille portion 20 is located adjacent an upper end 22 of the case 12, and a microphone grille portion 24 is located adjacent a lower end 26 of the case 12. Intermediate the upper and lower ends 22 and 26 is a call destination selector, in the form of a keypad 30, and an antenna 32 extends upwardly from the upper end 22. The case 12 includes a case wall 34 which provides the telephone 10 with an overall outer configuration 36 designed for aesthetic as well as for functional purposes.

Turning now to FIG. 4, a circuit board 40 is located within the case 12 and is connected to an earphone 42 placed behind the earphone grille portion 20, a microphone 44 placed behind the microphone grille portion 24, the keypad 30 and the antenna 32. The electronic components of the telephone 10 are carried by the circuit board 40 and a power source in the form of a power battery 46, connected to the circuit board 40 through a power switch 48 (see FIGS. 1 and 2), provides the power necessary to operate the telephone 10. In the preferred arrangement, the case wall 34 is relatively thin and is constructed of a relatively inexpensive synthetic polymeric material, such as by vacuum forming the front case member 14 and the rear case member 16 from thin sheets of ABS or styrene, the sheets typically having a thickness of about 0.060 inch. The illustrated components then are located within the case 12 and the case 12 is closed permanently, as by welding or by adhesive bonding along the abutting edges 18 of the case members 14 and 16. Prior to sealing the case 12 closed, a matrix 49 is placed in the case 12 so that the components located within the case 12 are embedded within the matrix 49 and cannot be accessed without destruction of the working arrangement of component parts. Additionally, the matrix 49 serves as a filler which mechanically reinforces the relatively thin wall 34 of the case 12. The matrix 49 preferably is constructed of a synthetic polymeric material, such as an epoxy resin, or a mastic-like material currently available for such use. In this manner, tampering is deterred. In total, the described construction is relatively inexpensive and therefore readily expendable.

In an alternate arrangement illustrated in FIG. 5, the power source includes an external power battery 46A, rather than the internal power battery 46, the external power battery 46A being received within a receptacle 46B in the case 12 and connected to circuit board 40, through power switch 48, by means of an electrical connector 46C. In this manner, power battery 46A may be recovered for further use, while telephone 10 is discarded, or an exhausted power battery 46A may be disposed of separately, in compliance with environmental considerations.

Figure 6:
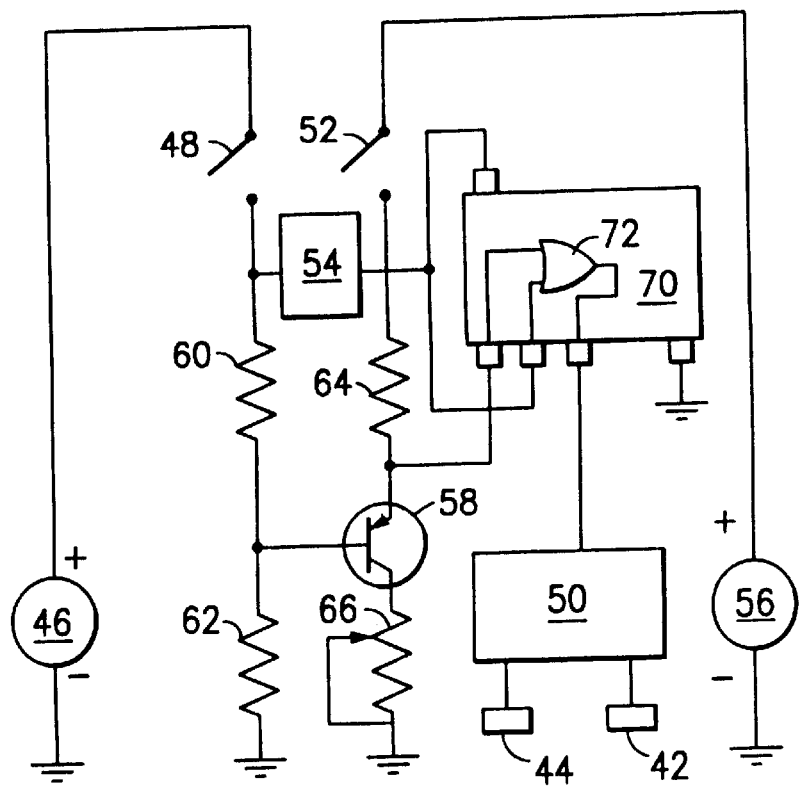
FIG. 6 is a schematic diagram showing a portion of the operating circuitry of the disposable wireless telephone.

Telephone 10 is rendered disposable by virtue of being capable of use only for the duration of a limited period, after which period telephone 10 is inoperative and is discarded. To that end, telephone 10 includes component parts which enable only limited use and ready disposal. Referring now to FIG. 6, as well as to FIG. 4, the circuitry incorporated into telephone 10, and located primarily on circuit board 40, is shown in schematic fashion and is seen to include telephonic means in the form of conventional wireless telephone circuitry 50 for receiving and transmitting wireless telephonic communications.

Enabling/disabling means are incorporated for enabling telephonic communication for only a predetermined limited period, and disabling telephonic communication upon expiration of the predetermined limited period, whereby telephone 10 is rendered inoperative and is capable of being discarded at the end of the predetermined limited period. In the embodiment illustrated in FIG. 6, telephone 10 includes selective operating means for operating the telephonic means for telephonic communications of selected durations. Thus, the selective operating means is shown in the form of a send/receive switch 52 selectively operated by the user of the telephone 10 to send a telephonic communication when a telephone call is to be made, and to terminate the telephonic communication when the call is complete. In this instance, switch 52 is actuated manually between an "on" mode and an "off" mode to effect a telephonic communication having a duration corresponding to the time during which switch 52 is in the "on" mode. With the power switch 48 turned on, power from the power battery 46 is supplied, through a voltage regulator 54, to the wireless telephonic circuitry 50, as follows.

Setting means is utilized for determining the duration of the predetermined limited period over which the telephone 10 will be operative. In the illustrated embodiment, the setting means includes a setting battery 56 of selected, known capacity. With the power switch 48 in the "on" position and switch 52 in the "on" mode, setting battery 56 is connected to the collector of a transistor 58, and the transistor 58 is biased by the power battery 46. The choice of the values for resistors 60, 62, 64 and 66 will determine the rate of flow of current from the setting battery 56, and thus will provide a measured duration based upon the life of the setting battery 56. For example, where the setting battery 56 has a capacity of 30 mAH and the values of resistors 60, 62, 64 and 66 are chosen to draw 30 mA when switch 52 is in the "on" mode, the measured duration provided by the life of the setting battery 56 will be one hour.

An integrated circuit 70 provides an AND gate 72 interposed between the voltage regulator 54 and the telephone circuitry 50 and connected to the collector of the transistor 58 such that at the end of the measured duration provided by the life of the setting battery 56, power to the telephone circuitry will be discontinued by the AND gate 72, which serves as a disabling means, so that the telephone circuitry 50 will be disabled and telephone 10 will become inoperative. Accordingly, each time the switch 52 is placed in the "on" mode to make a telephone call, current will flow from the setting battery 56 at the selected rate. When the switch 52 is placed in the "off" mode at the end of the telephone call, the duration of the telephone call will have drained a given amount of the capacity of setting battery 56. When the sum of the durations of the telephone calls reaches the measured duration provided by the life of the setting battery 56, the telephone circuitry 50 is disabled and the telephone 10 becomes inoperative and is discarded.

Figure 7:
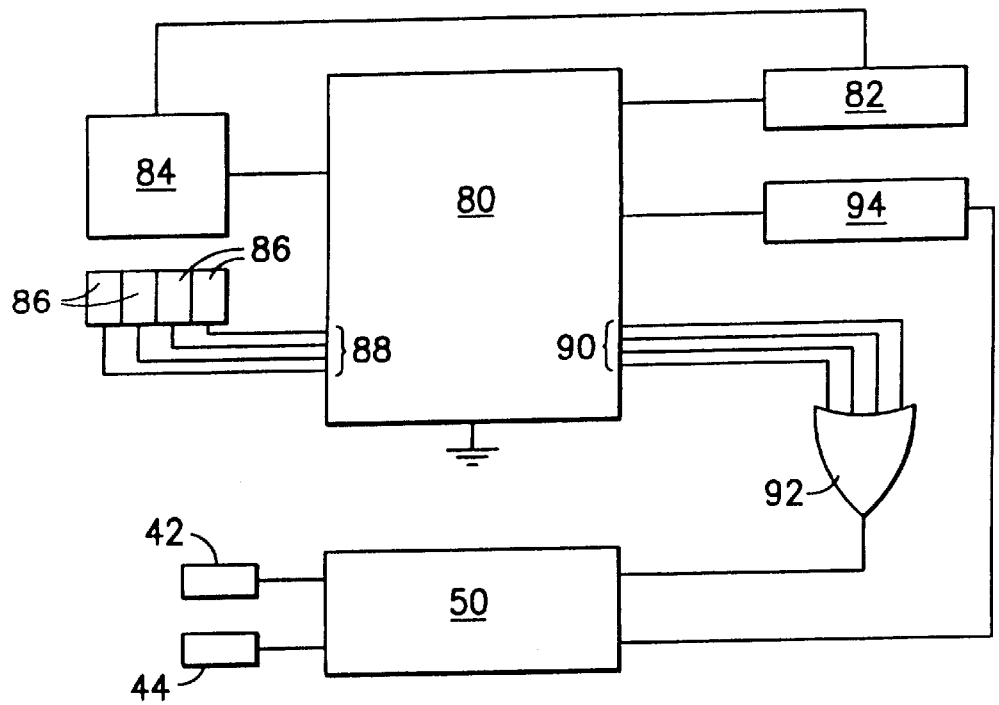
FIG. 7 is a schematic diagram showing an alternate embodiment.

In an alternate arrangement illustrated in FIG. 7, the setting means includes a timing mechanism 80 powered continuously by a power supply 82 and connected to an oscillator 84, which also is powered by the power supply 82 and supplies the timing mechanism 80 with a timing signal. Selector means, shown in the form of manually operated thumb wheels 86, enable the input of a prescribed time into the timing mechanism 80, through input terminals 88. Output terminals 90 of the timing mechanism 80 are connected to the telephone circuitry 50 through an OR gate 92. A start/stop indicator 94 is responsive to the send/receive switch 52 such that upon the initiation of a telephone call, a start signal is provided to the timing mechanism 80 and upon completion of the telephone call, a stop signal is provided to the timing mechanism 80, enabling the timing mechanism 80, in concert with the oscillator 84, to count toward the prescribed time set into the timing mechanism 80 by the thumb wheels 86, for the duration of each telephone call, and thus compare the sum of the selected durations to the prescribed time set into the timing mechanism 80. When the sum of the durations of the telephone calls reaches the prescribed time set into the timing mechanism 80, the OR gate 92, which serves as a disabling means, discontinues power to the telephone circuitry 50, so that the telephone circuitry 50 will be disabled and telephone 10 will become inoperative.

In both of the alternatives illustrated in FIGS. 6 and 7, once the setting means is set for the predetermined limited period, the setting means is embedded within the matrix 49, along with the remainder of the internal components of the telephone 10, as described above, so as to deter tampering which could alter the duration of the predetermined limited period.

Figure 8:
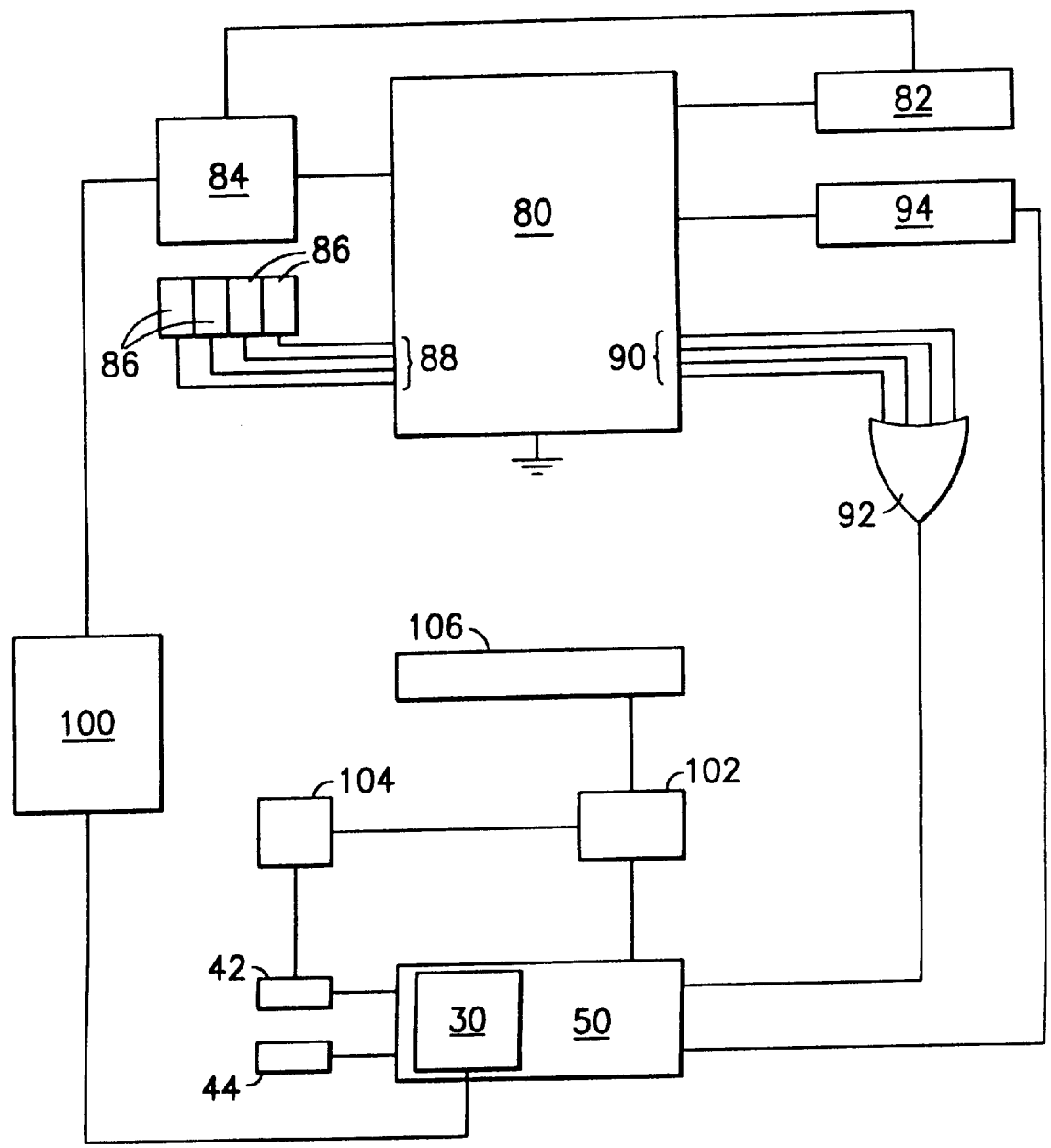
FIG. 8 is a schematic diagram showing another alternate embodiment.

The alternate arrangement illustrated in FIG. 8 enables telephone 10 to be utilized for telephone communications which are directed to different rate destinations. Since telephone rates ordinarily differ in accordance with the destination of a telephone call, such as local calls, out-of-area calls, long-distance calls and international calls, the alternate of FIG. 8 accommodates such differences. Thus, in addition to the arrangement described above, in connection with FIG. 7, a rate code means shown in the form of a rate code analyzer 100, is placed in the arrangement so as to be responsive to the keypad 30 of the telephone circuitry 50 for operating the oscillator 84 and, hence, the timing mechanism 80, at a rate determined by the destination of the telephone call selected at the keypad 30. The selector means, again shown in the form of thumb wheels 86, enable the input of a selected maximum time into the timing mechanism 80, through the input terminals 88. As before, the timing mechanism 80, in concert with the oscillator 84, counts toward the prescribed time set into the timing mechanism 80 by the thumb wheels 86, for the duration of each telephone call.

However, in the present arrangement, each telephone call is weighted with a rate factor, by the rate code analyzer 100; that is, the rate code analyzer 100 is responsive to the keypad 30 for operating the timing mechanism 80, through varying the rate of operation of the oscillator 84, at a rate determined by the destination of the telephone call selected at the keypad 30. In this manner, the duration of the limited period during which the timing mechanism 80 permits telephonic communications, after the expiration of which limited period power to the telephone circuitry 50 is discontinued, so that the telephone circuitry 50 will be disabled and telephone 10 will become inoperative, is varied in accordance with the call rate applied to each telephone call. Thus, telephone 10 is activated and charged at a point of purchase with preset call rates for a predetermined use cycle and, upon reaching the end of the use cycle, the telephone 10 is rendered inoperative and is discarded.

For example, where telephone 10 is capable of being used for telephone calls in a local area at a first call rate, for out-of-area calls at a second call rate which is twice the first call rate, for long-distance calls at a third call rate which is three times the first call rate, and for international calls at a fourth call rate which is four times the first call rate, telephone 10 is charged initially with a use time of one hour of local telephone calls, as by setting the timing mechanism 80 for a maximum limited period of one hour. Upon selection of the telephone call destination at the keypad 30, the rate code analyzer 100 determines which of the four call rates is applicable to the selected telephone call destination and operates the oscillator 84 at a corresponding rate so that the timing mechanism 80 will count at a faster or slower rate, depending upon the applicable call rate. Thus, if all telephone calls are within the local calling area, the calls will be weighted with the first call rate and the telephone 10 will remain in operation for a total of one hour of telephone call time. If the telephone calls are all international telephone calls, the calls will be weighted with the fourth call rate and the telephone 10 will remain in operation for a total of fifteen minutes. Telephone calls placed in the various four areas will result in the application of corresponding call rates so that the duration of the limited period during which the telephone 10 can remain in operation is varied in accordance with the accumulated telephone call time, as weighted by the different call rates.

The arrangement of FIG. 8 includes a use-time indicator 102 having both an audio indicator 104, which applies an audible indication in the form of a muted buzzing sound to the earphone 42, and a visual indicator 106, which furnishes a visible indication, both the audible and visible indications advising that only a limited amount of use time, for example, five minutes, remains available.

Figure 9:
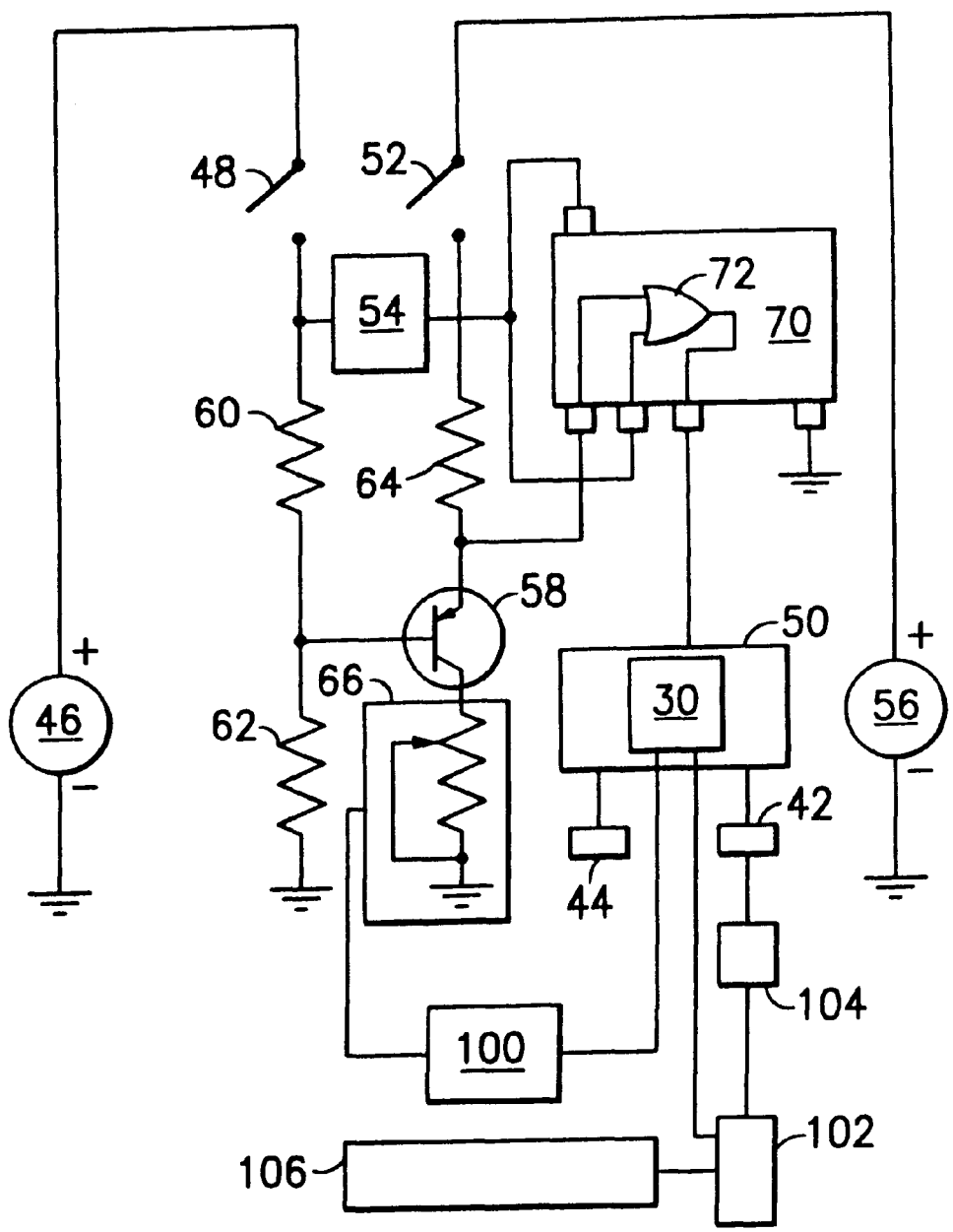
FIG. 9 is a schematic diagram showing a further alternate embodiment.
Figures 10, 11:
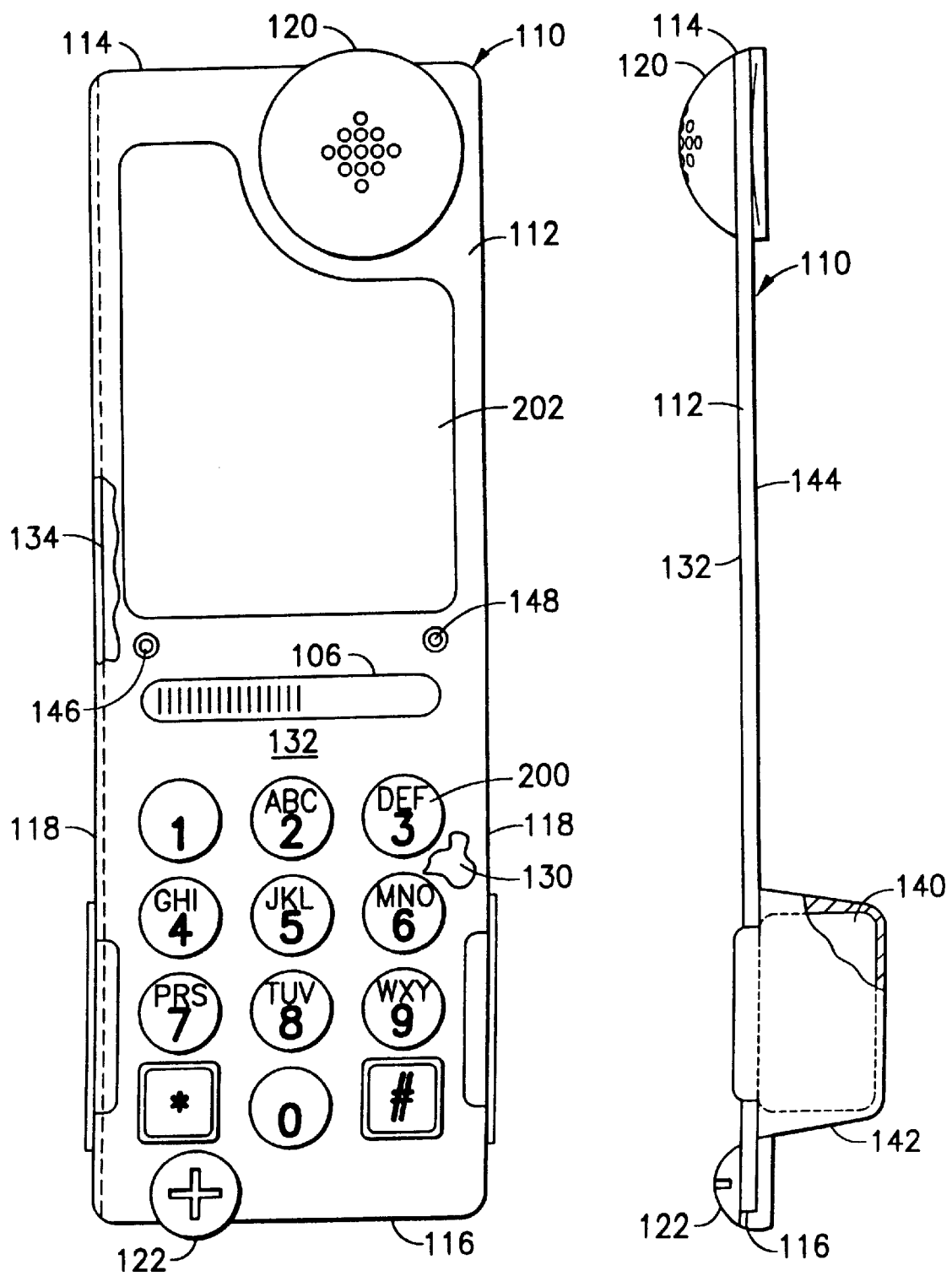
FIG. 10 is a front elevational view of another disposable wireless telephone constructed in accordance with the present invention.
FIG. 11 is a side elevational view of the disposable wireless telephone of FIG. 10.
Figure 12:
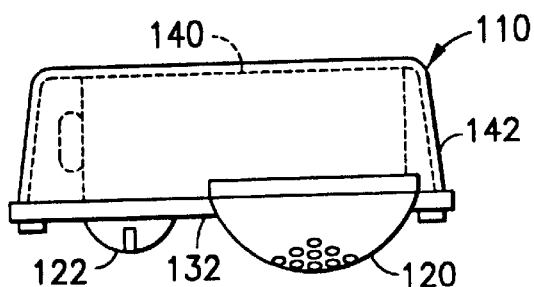
FIG. 12 is a top plan view of the telephone of FIG. 10.
Figure 13:
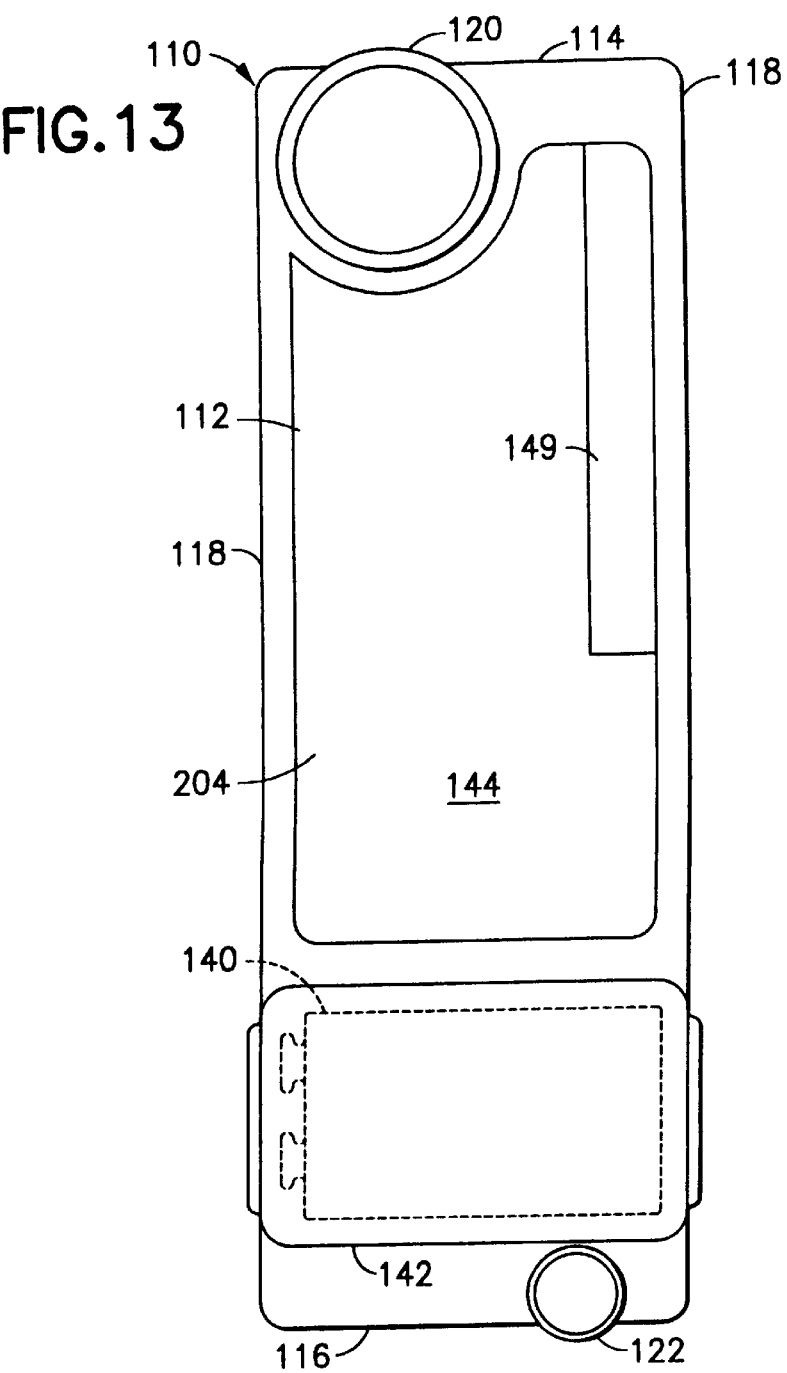
FIG. 13 is a rear elevational view of the telephone of FIG. 10.

In the further alternate arrangement illustrated in FIG. 9, rate code analyzer 100 is placed in an arrangement similar to the arrangement described in connection with FIG. 6, so as to be responsive to the keypad 30 of the telephone circuitry 50 for operating the variable resistor 66 to draw current from the setting battery 56 at a rate determined by the destination of the telephone call selected at the keypad 30. Thus, the duration of the limited period provided by the life of the setting battery 56 is varied in accordance with the call rate applied to each telephone call, in a manner analogous to that described in connection with the arrangement of FIG. 8. As in the arrangement of FIG. 8, the alternate arrangement of FIG. 9 includes a use-time indicator 102 having an audio indicator 104 and a visual indicator 106.

In order to further simplify the distribution and use of telephones constructed in accordance with the present invention, preferably all of the telephones distributed from one particular source are provided with one common telephone number. In a preferred construction, telephone circuitry 50 enables the transmitting and receiving of telephonic communication only for those telephonic communications initiated at the disposable wireless telephone constructed in accordance with the present invention.

In this connection, a call signal transmitted from a telephone constructed in accordance with the invention preferably includes an intermittent encrypted code so that a connection is maintained throughout the course of a telephonic communication. Any unencrypted signal is dropped out within a very short time to prevent unauthorized use of the carrier signal service. In this manner the telephone and the use-time is prepaid at the time of purchase of the telephone and there in no necessity for any complex real-time use billing system. Thus, in the preferred arrangement, telephone circuitry 50 is capable of calling out only, and cannot receive incoming calls, thereby eliminating assigned transmitting coded identification circuitry required for actual use-time monthly billing. In this manner, telephone circuitry 50 is simplified and is rendered less expensive, and telephones constructed in accordance with the invention are more economically disposable. Further, selective means for monitoring and billing the specific use-time of each wireless telephone is eliminated, thereby eliminating the need for monitoring means ordinarily used by the billing agency, with a concomitant reduction in the complexity of the operating overhead of the billing agency for overall economy. The simplified air carrier (billing agency) infrastructure is reflected in significantly lower airtime rates since individual account frequencies, monitoring, billing and collection no longer are required, and the economies thus realized facilitate the disposable nature of wireless telephones constructed in accordance with the present invention.

Turning now to FIGS. 10 through 16, another disposable wireless telephone is illustrated generally at 110 and is seen to have an integrated body 112 extending longitudinally between a top end 114 and an opposite bottom end 116 and laterally between opposite sides 118. An earphone assembly 120 is connected to the body 112 at the top end 114, preferably offset toward one side 118 of the body 112, and a microphone assembly 122 is connected to the body 112 at the bottom end 116. A keypad 130 is placed beneath the front face 132 of the body 112, adjacent the bottom end 116, and an antenna 134 is embedded within the body 112 and extends longitudinally adjacent one of the sides 118. A power battery 140 is housed within a battery housing 142 attached to the body 112 at the rear face 144 of the body 112, all in a manner set forth more specifically below. A power switch 146 controls power from the power battery 140, and a send/receive switch is shown at 148. The body 112 is relatively thin between the front face 132 and the rear face 144 and preferably includes a magnetic strip 149 along the rear face 144 for enabling activation of the telephone 110. The construction of body 112, as set forth in detail hereinafter, provides the body 112 with a mechanical stiffness which enables the telephone 110 to be hand held during use in telephonic communication.

Figure 14:
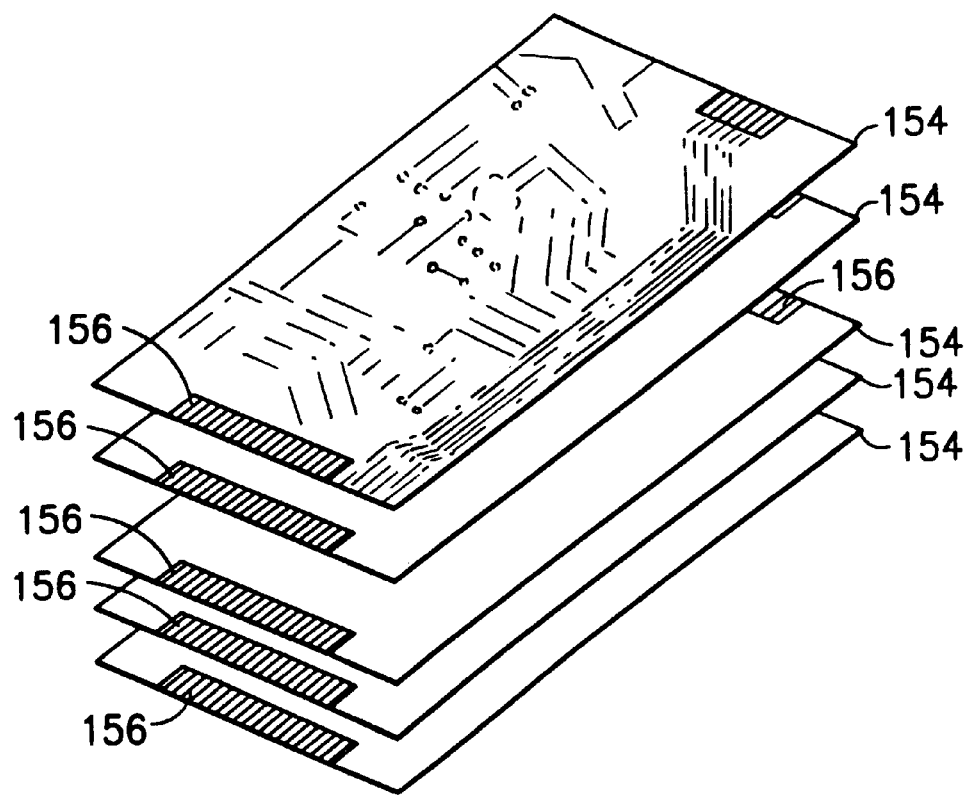
FIG. 14 is an exploded perspective, partially diagrammatic, view of a component of the telephone of FIG. 10.
Figure 15:
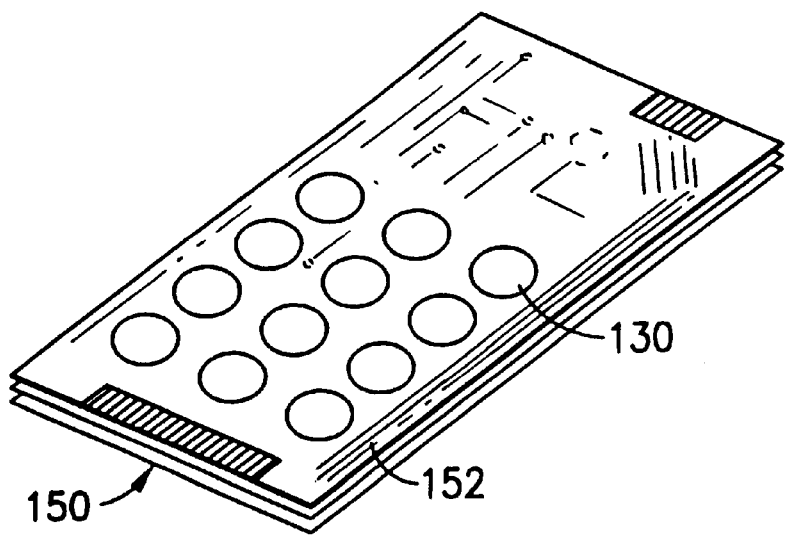
FIG. 15 is a perspective, partially diagrammatic, view of the component of FIG. 14.
Figure 16:
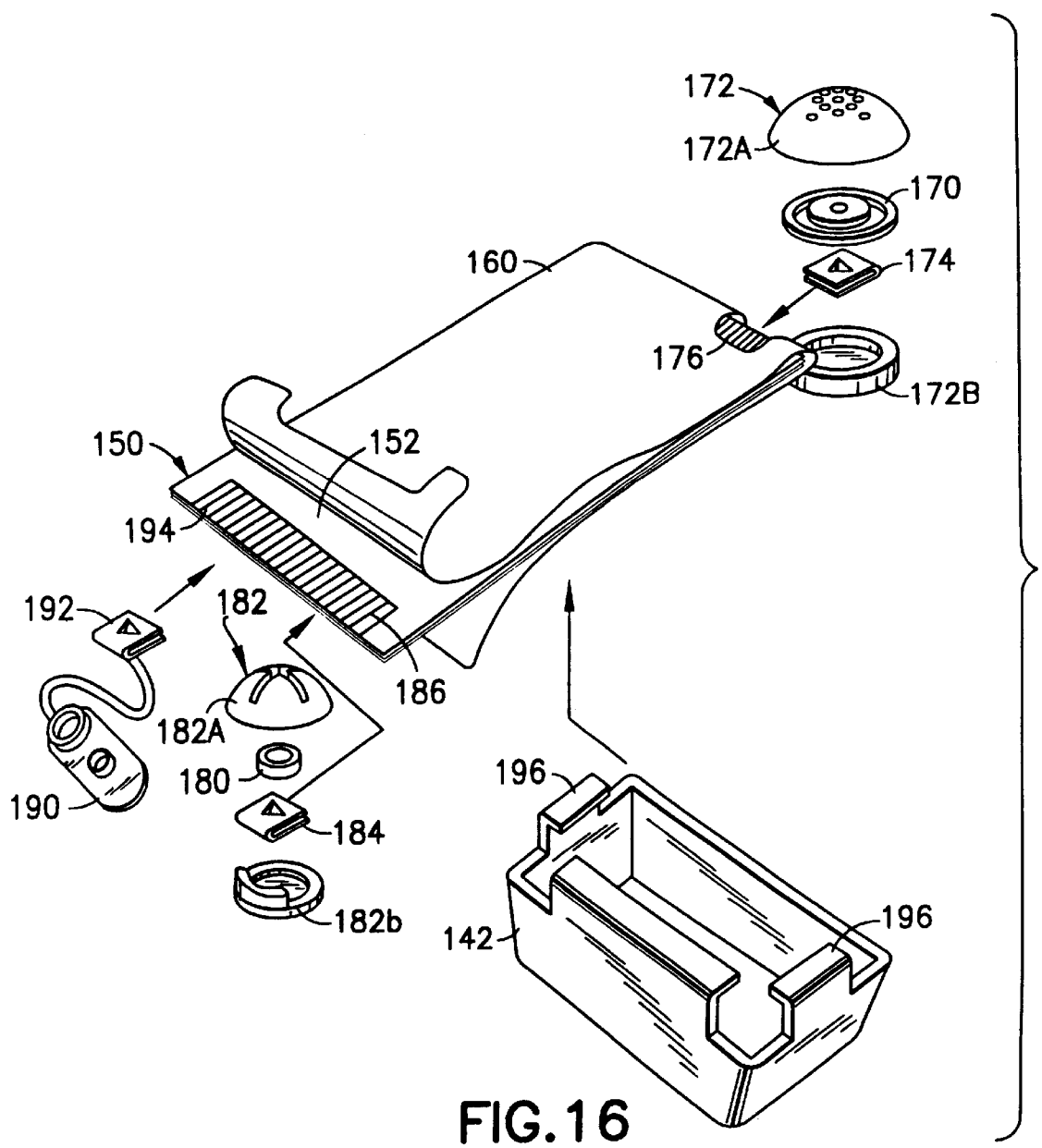
FIG. 16 is an exploded perspective, partially diagrammatic, view of the telephone of FIG. 10.

As best seen in FIGS. 14 through 16, body 112 of telephone 110 includes a core 150 comprised of a circuit board 152 which carries the circuitry and the electronic components of the telephone 110. In order to provide a sufficient area for the necessary circuitry and electronic components, while confining the longitudinal length and lateral width of the circuit board 152 to the restricted dimensions of the core 150 of the body 112, as dictated by the size of the hand held telephone 110, circuit board 152 is constructed of a plurality of layers 154 which are laminated together to establish the circuit board 152. Each layer 154 carries circuitry and components and the circuitry among the layers 154 is connected upon joining the layers 154 in the single laminated structure illustrated as circuit board 152, as by connectors 156 on the layers 154.

Once the core 150 is complete, the core 150 is wrapped in a sheath 160 to complete the body 112. Sheath 160 preferably is constructed of a thin, compliant material which closely covers, and preferably is laminated to, the core 150, and which accepts printing or another means for displaying indicia on the faces 132 and 144 of the body 112. A preferred material for sheath 160 is a synthetic polymeric material such as polyvinylchloride. The earphone assembly 120 protrudes beyond the sheath 160 and includes an earphone 170 placed within an earphone housing 172, between upper and lower housing members 172A and 172B, and connected to a clip connector 174 which, in turn, is clipped to the circuit board 152 at 176 to be mounted mechanically on the core 150 and connected electrically to the circuit board 152. The microphone assembly 122 protrudes beyond the sheath 160 and includes a microphone 180 placed within a microphone housing 182, between upper and lower housing members 182A and 182B, and connected to a clip connector 184 which, in turn, is clipped to the circuit board 152 at 186 to be mounted mechanically on the core 150 and connected electrically to the circuit board 152. Similarly, a battery connector 190 protrudes beyond the sheath 160 and is connected to a clip connector 192 which, in turn, is clipped to the circuit board 152 at 194. Battery connector 190 is connected to power battery 140 and battery housing 142 is mounted upon body 112 by means of clips 196 which are integral with battery housing 142.

Returning now to FIGS. 10 through 13, in the preferred construction, keypad 130 lies beneath the sheath 160 and keypad indicia 200 is printed upon the sheath 160, on the front face 132 of the body 112, the resilient nature of the sheath 160 enabling the keypad 130 to be actuated by depressing the sheath 160 at the appropriate locations, as indicated by the printed indicia 200. Additional graphic areas 202 and 204 are provided on the front face 132 and on the rear face 144 for optionally displaying advertising and promotional graphics.

Telephone 110 is very lightweight, compact and rugged, as well as resistant to damage from water and the elements. The construction is aesthetically pleasing and enables relatively economical manufacture, rendering telephone 110 expendable and readily disposable. Each of the alternatives illustrated in FIGS. 6, 7, 8 and 9 provides a simple and economical arrangement for enabling telephones 10 and 110 to be constructed at minimal cost for use for only a limited period, after which period the telephone 10 or 110 is inoperative and may be discarded. These alternatives are provided by way of example, other alternative arrangements being available for assuring that the telephone 10 or 110 is rendered operative only for a limited time. Thus, telephones constructed in accordance with the present invention may be purchased at a relatively low price and made available at a very wide variety of sales outlets. In this manner, wireless telephones and wireless telephone services are made available to a much wider population for convenience as well as for emergency uses, with economy.

It will be seen that the present invention attains the several objects and advantages summarized above; namely: Simplifies and renders more economical the use of wireless telephone services; renders wireless telephone services available to a larger audience at lowered cost; facilitates the distribution and use of wireless telephones; reduces the expense of wireless telephones and wireless telephone services; promotes the use of wireless telephones and wireless telephone services by those who otherwise would not invest in a wireless telephone and expend funds for wireless telephone services; makes available prepaid wireless telephone services at relatively low cost and greater convenience; facilitates the availability of wireless telephones and wireless telephone services for emergency uses; provides added convenience in obtaining as well as using wireless telephones and wireless telephone services.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A disposable wireless telephone capable of use for telephonic communication by a user only during a limited period, after which period the telephone is rendered incapable of use and is discarded, the telephone comprising:

telephonic means within the telephone itself for transmitting and receiving telephonic communications, the telephonic means including a call destination selector for selecting the destination of a telephonic communication, the destination being selected from different rate destinations;

enabling/disabling means within the telephone itself for enabling the telephonic means for telephonic communications during the limited period and rendering the telephone incapable of use upon expiration of the limited period;

selective operating means within the telephone itself for operating the telephonic means for telephonic communications of selected durations;

the enabling/disabling means including setting means within the telephone itself for setting a predetermined maximum duration of the limited period prior to delivery of the telephone to the user, and disabling means within the telephone itself and responsive to the selective operating means for rendering the telephone incapable of use in response to the sum of the selected durations reaching the duration of the limited period; and tamper deterrent means within the telephone itself for precluding access to the setting means for any alteration of the predetermined maximum duration of the limited period once the setting means has been set so as to preclude any resetting of the predetermined maximum duration of the limited period subsequent to delivery of the telephone to the user such that the telephone itself is rendered incapable of use beyond the limited period and is capable of being discarded;

the setting means including rate code means responsive to the call destination selector for operating the setting means at a rate determined by the selected destination of the telephonic communication to vary the duration of the limited period, up to the predetermined maximum duration, in accordance with the selected destination of the telephonic communication so as to enable telephonic communications to different rate destinations during the duration of the limited period;

the telephonic means comprising telephonic circuitry enabling the transmitting and receiving of telephonic communication only for telephonic communications initiated at the disposable wireless telephone.

2. The invention of claim 1 wherein the setting means includes a source of power of given capacity, and the rate code means is responsive to the call destination selector for varying the rate of flow of current from the source of power in accordance with the selected destination of the telephonic communication.

3. The invention of claim 1 wherein the setting means includes a timing mechanism, and the rate code means is responsive to the call destination selector for varying the rate of operation of the timing mechanism in accordance with the selected destination of the telephonic communication.

4. A disposable wireless telephone capable of use for telephonic communication by a user only during a predetermined limited period, after which period the telephone itself is rendered incapable of use and is discarded, the telephone comprising:

telephonic means within the telephone itself for transmitting and receiving telephonic communications;

enabling/disabling means within the telephone itself for enabling the telephonic means for telephonic communications during the predetermined limited period and rendering the telephone incapable of use upon expiration of the predetermined limited period;

the enabling/disabling means including setting means for setting the duration of the predetermined limited period prior to delivery of the telephone to the user;

selective operating means within the telephone itself for operating the telephonic means for telephonic communications of selected durations;

the enabling/disabling means including disabling means within the telephone itself and responsive to the selective operating means for rendering the telephone itself incapable of use when the sum of the selected durations reaches the predetermined limited period; and tamper deterrent means within the telephone itself for precluding access to the setting means for any alteration of the duration of the predetermined limited period once the setting means has been set so as to preclude any resetting of the predetermined limited period subsequent to delivery of the telephone to the user such that the telephone itself is rendered incapable of use beyond the predetermined limited period and is capable of being discarded;

the telephonic means comprising telephonic circuitry enabling the transmitting and receiving of telephonic communication only for telephonic communications initiated at the disposable wireless telephone.

5. The invention of claim 4 wherein the telephone includes a circuit board, and a sheath wrapped around the circuit board such that the circuit board and the sheath comprise an integrated body capable of being hand held during telephonic communications.

6. The invention of claim 5 wherein the circuit board comprises a plurality of layers laminated into an integral circuit board having a mechanical stiffness and dimensions for being hand held.

7. The invention of claim 6 wherein the sheath is laminated to the integral circuit board to establish the integrated body.

8. The invention of claim 7 including:
an earphone attached to the circuit board and protruding beyond the sheath;
a microphone attached to the circuit board and protruding beyond the sheath; and
a battery connector attached to the circuit board and protruding beyond the sheath.

9. The invention of claim 7 including a keypad on the circuit board, the sheath overlapping the keypad and including indicia for enabling operation of the keypad through the sheath.

10. A method of using a disposable wireless telephone for telephonic communications during only the duration of a limited period, after which period the telephone itself is rendered incapable of use and is discarded, the telephone including telephonic means for transmitting and receiving telephonic communications, the method comprising:

setting the duration of the limited period prior to delivery of the telephone to a user;

enabling the telephonic means itself for telephonic communications during the set duration of the limited period, and only for telephonic communications initiated at the disposable wireless telephone;

operating the telephonic means for telephonic communications of selected durations;

rendering the telephone incapable of use upon the sum of the selected durations reaching the set duration of the limited period; and precluding any alteration of the duration of the limited period, once the duration of the limited period is set, subsequent to delivery of the telephone to the user such that the telephone is rendered incapable of use beyond the limited period and is capable of being discarded.

11. The invention of claim 10 including:

selecting the destination of a telephonic communication, the destination being selected from different rate destinations;

setting a predetermined maximum duration of the limited period prior to delivery of the telephone to the user; and varying the duration of the limited period, up to the predetermined maximum duration, in accordance with the selected destination of the telephonic communication so as to enable telephonic communications to different rate destinations during the duration of the limited period.

12. The invention of claim 11 including discarding the telephone upon expiration of the limited period.

* * * * *